(12) United States Patent
Orlowsky et al.

(10) Patent No.: US 8,544,928 B2
(45) Date of Patent: Oct. 1, 2013

(54) FLEXIBLE STORAGE COMPARTMENT FOR VEHICLE INTERIOR TRIM

(75) Inventors: Michael G. Orlowsky, Sterling Heights, MI (US); Kenneth S. Laird, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/343,277

(22) Filed: Jan. 4, 2012

(65) Prior Publication Data
US 2013/0168992 A1 Jul. 4, 2013

(51) Int. Cl.
*B60R 7/04* (2006.01)

(52) U.S. Cl.
USPC .................. 296/37.13; 296/146.7; 224/543

(58) Field of Classification Search
USPC ............... 296/37.13, 146.7, 152, 37.1, 146.1, 296/37.8, 37.12; 49/502; 224/542, 543, 224/544, 275
See application file for complete search history.

(56) References Cited

U.S. PATENT DOCUMENTS

| | | | | |
|---|---|---|---|---|
| 5,261,716 A | * | 11/1993 | Phelps | 296/37.8 |
| 5,499,853 A | * | 3/1996 | Pourian | 296/37.13 |
| 6,003,926 A | * | 12/1999 | Labeur | 296/37.8 |
| 6,328,191 B1 | * | 12/2001 | Conley et al. | 224/563 |
| 6,471,276 B1 | | 10/2002 | Brunsman et al. | |
| 6,682,115 B1 | | 1/2004 | Tiesler | |
| 6,926,332 B2 | | 8/2005 | Youngs et al. | |
| 6,971,698 B1 | | 12/2005 | King | |
| 7,798,548 B2 | | 9/2010 | Embach et al. | |
| 2008/0001423 A1 | * | 1/2008 | Ercolano et al. | 296/37.8 |
| 2010/0244506 A1 | * | 9/2010 | Terleski et al. | 297/188.05 |

FOREIGN PATENT DOCUMENTS

GB 1305189 * 1/1973

* cited by examiner

*Primary Examiner* — Jason S Morrow
*Assistant Examiner* — E Turner Hicks
(74) *Attorney, Agent, or Firm* — Vichit Chea; MacMillan, Sobanski & Todd, LLC

(57) ABSTRACT

A storage compartment such as a map pocket is provided over a recess in the door panel of a transportation vehicle. A frame includes a U-shaped member and a flexible spring piece coupled between the ends of the U-shaped member. The flexible spring piece has a length greater than the distance between the ends so that it tends to assume either a closed position proximate the recess or an open position away from the recess. A pocket cover has a front portion concealing the frame and has a folding side portion disposed between side and bottom edges of the frame and the door panel along corresponding edges of the recess. A tether is coupled to the frame for urging the frame toward the door panel while permitting the frame to be moved away from the door panel.

13 Claims, 5 Drawing Sheets

FLEXIBLE STORAGE COMPARTMENT FOR VEHICLE INTERIOR TRIM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to storage compartments in motor vehicles, and, more specifically, to an expandable compartment on a door panel.

Typical automobiles and other transportation vehicles include a variety of storage features such as a compartment located along the bottom interior surface of a vehicle side entry door. This compartment is commonly referred to as a map pocket. This pocket is usually molded from hard plastic as an outward extension from the door panel. The conventional pocket creates a dedicated space/volume for storage intruding into the passenger area regardless of whether anything is actually stored there. Furthermore, the opening is usually not covered which detracts from the overall appearance and may allow items to fall out of the map pocket while driving on bumpy surfaces, for example. Thus, a closable and retractable map pocket would be desirable.

SUMMARY OF THE INVENTION

In one aspect of the invention, a storage compartment is provided for a transportation vehicle. The vehicle has a door panel with a recess. A frame comprises a U-shaped member and a flexible spring piece, wherein the U-shaped member has a first terminus and a second terminus separated by a predetermined distance. The flexible spring piece has first and second ends connected to the first terminus and the second terminus, respectively. The flexible spring piece has a length between the first and second ends greater than the predetermined distance so that the flexible spring piece tends to assume either a closed position proximate the recess or an open position away from the recess. A pocket cover has a front portion concealing the frame and has a folding side portion disposed between side and bottom edges of the frame and the door panel along corresponding edges of the recess. A tether is coupled to the frame for urging the frame toward the door panel while permitting the frame to be moved away from the door panel.

DETAILED DESCRIPTION OF PREFERRED EMBODIMENTS

The present invention provides a flexible storage compartment having an upper side that is closable and an outer surface that is expandable to accommodate contents placed therein while minimizing protrusion into the passenger compartment. The pocket has a foldable material along the sides and bottom, and includes a soft cover made of PVC, leather, or other material that conforms to the surrounding door panel surfaces when closed thereby providing an improved visual appearance. A substantially rigid frame along the sides and bottom of the cover may be constructed of stamped aluminum, or a stiff, injection-molded reinforced plastic resin, for example. A spring steel member across the top of the U-shaped frame has a length greater than the distance between the ends of the U-shaped frame in order to provide an opening/closing effect. Cover material is folded over the frame which also bridges the area between the cover and the door panel when the map pocket is expanded. Tethers (such as an elastic cord or mechanical springs) attach the frame to the door panel in order to contract the pocket against the door panel or the contents within the map pocket. A recess is provided in the door panel in order to obtain a flush fit of the cover with the door panel when the map pocket is empty.

Figure 1:
FIG. 1 is a perspective view of a map pocket of the present invention in the closed position.
Figure 2:
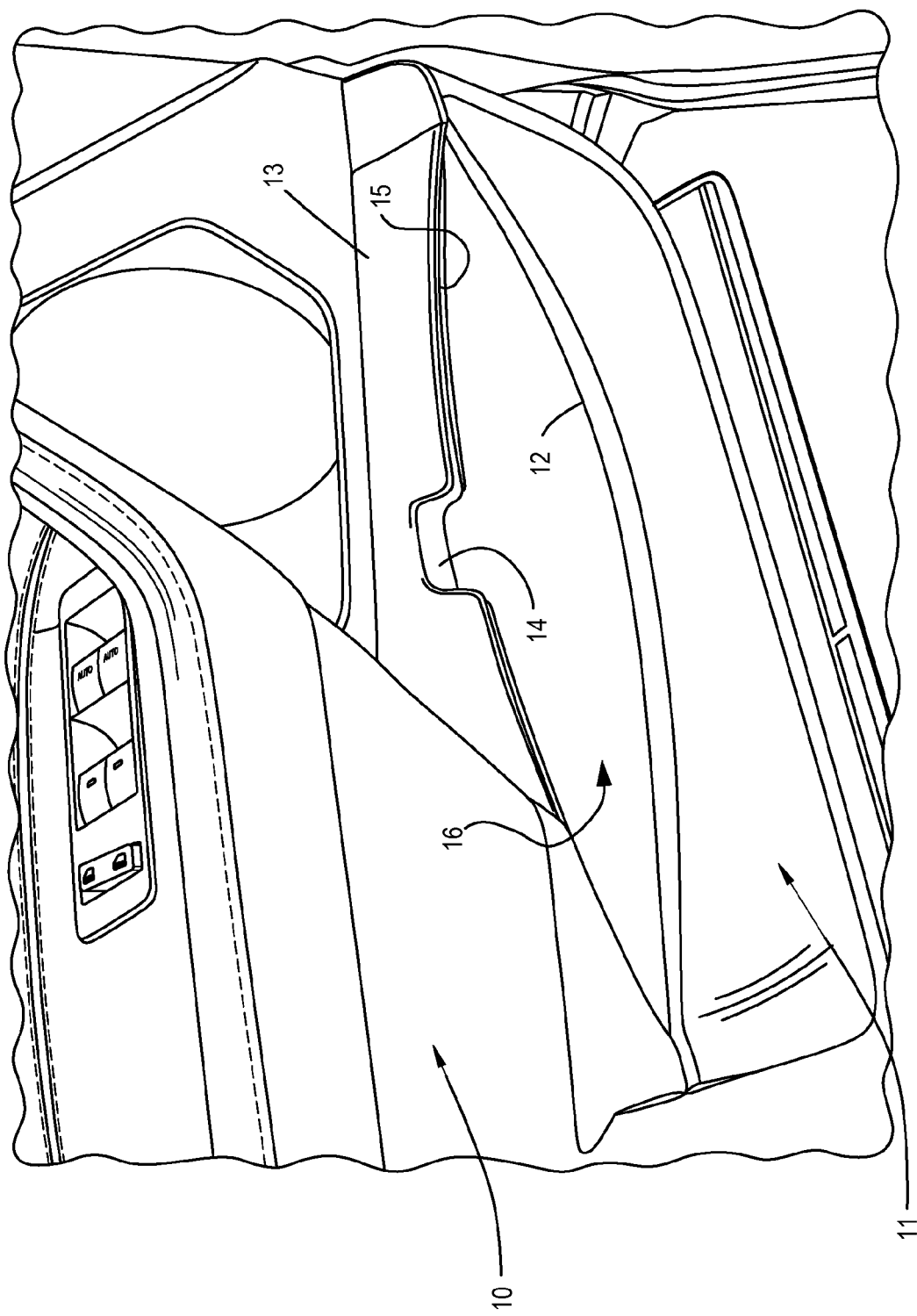
FIG. 2 is a perspective view of a map pocket of the present invention in the open position.

Referring now to FIG. 1, a door panel 10 includes a map pocket 11 with an upper edge 12. A contoured shelf 13 is disposed along upper edge 12 and has a finger notch 14 to create a gap to facilitate grasping of upper edge 12 to pull open map pocket 11. Shelf 13 preferably has a concave contoured edge 15 shaped to receive map pocket upper edge 12 when it is closed. FIG. 2 shows map pocket 11 pulled to an open position creating access to a recess 16 in door panel 10 and the storage space behind pocket 11.

Figure 3:
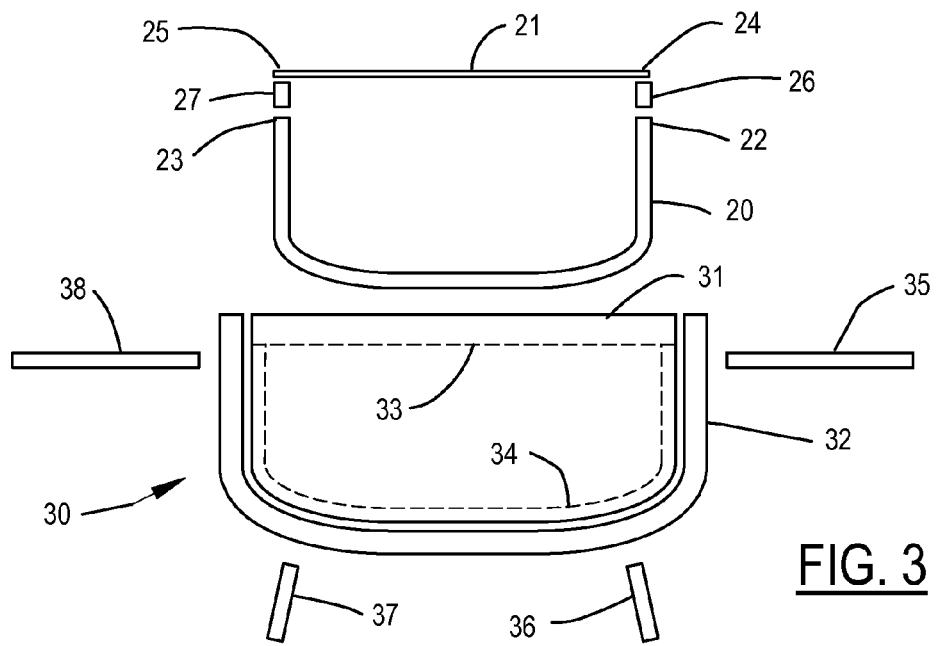
FIG. 3 is an exploded view of a frame and pocket cover of the invention.

The main components of the map pocket are shown in FIG. 3. A U-shaped member 20 is attached to a flexible spring piece 21. U-shaped member 20 is substantially rigid and may be comprised of a stamped metal or a molded plastic, for example. U-shape member 20 has a first terminus 22 and a second terminus 23 for receiving spring piece 21. Spring piece 21 has first and second ends 24 and 25 coupled to terminus 22 and terminus 23, respectively. The length of spring piece 21 between ends 24 and 25 is greater than a distance between terminus 22 and terminus 23. Thus, spring piece 21 tends to spring to one side or the other between its ends, corresponding to the open and closed positions of the map pocket.

Spring piece 21 may be connected to U-shaped member 20 via various types of hard connection, such as a weld, a screw, or other fastener. Preferably, a pivotable connection may be provided by using posts 26 and 27 that are pivotally coupled to terminus 22 and terminus 23, respectively. Posts 26 and 27 may include slots (not shown) for receiving ends 24 and 25, thereby allowing spring piece 21 to be moved between its open and closed positions more easily.

The rectangular frame comprised of U-shaped member 20 and spring piece 21 is retained in a pocket cover 30, including a front portion 31 and a folding side portion 32. Portions 31 and 32 are preferably constructed of a soft cover stock material such as PVC, leather, or a durable fabric of a type used in automobile interiors. Portions 31 and 32 may be a single piece or may be separate pieces as shown in FIG. 3. The separate pieces may be sewn together, for example. Front portion 31 is folded along dashed lines 33 and 34 in order to attach to and conceal U-shaped member 20 and spring piece 21. After folding, the folds may be glued or sewn in order to permanently retain the frame.

The map pocket is tethered to the door panel using tethers 35-38. Each tether has one end connected to the map pocket, e.g., by attaching it to U-shaped member 20 or to a corresponding portion of pocket cover 30 on the outboard side of the folds (i.e., closest to member 20). Tethers 35 and 38 connect at the upper ends of the left and right sides of pocket 30, and tethers 36 and 37 connect along the bottom edge of pocket 30. Tethers 35-38 preferably pass through the door panel and have their other ends attach to anchor points (not shown) sufficiently removed along the door panel to provide a stretching capacity that accommodates the desired expansion while maintaining an appropriate amount of force for urging the pocket frame toward the door panel. The tethers must be sufficiently long to permit the frame to be pulled away from the door panel when inserting contents into the pocket. Tethers may be preferably comprised of stretchable elastic (commonly referred to as a bungee cord). The majority of the length of the tethers formed of stretchable elastic would be concealed behind the door panel in order to accommodate the desired lengths. Instead of stretchable elastic, a mechanical spring system or tensioner can be used.

Figure 4:
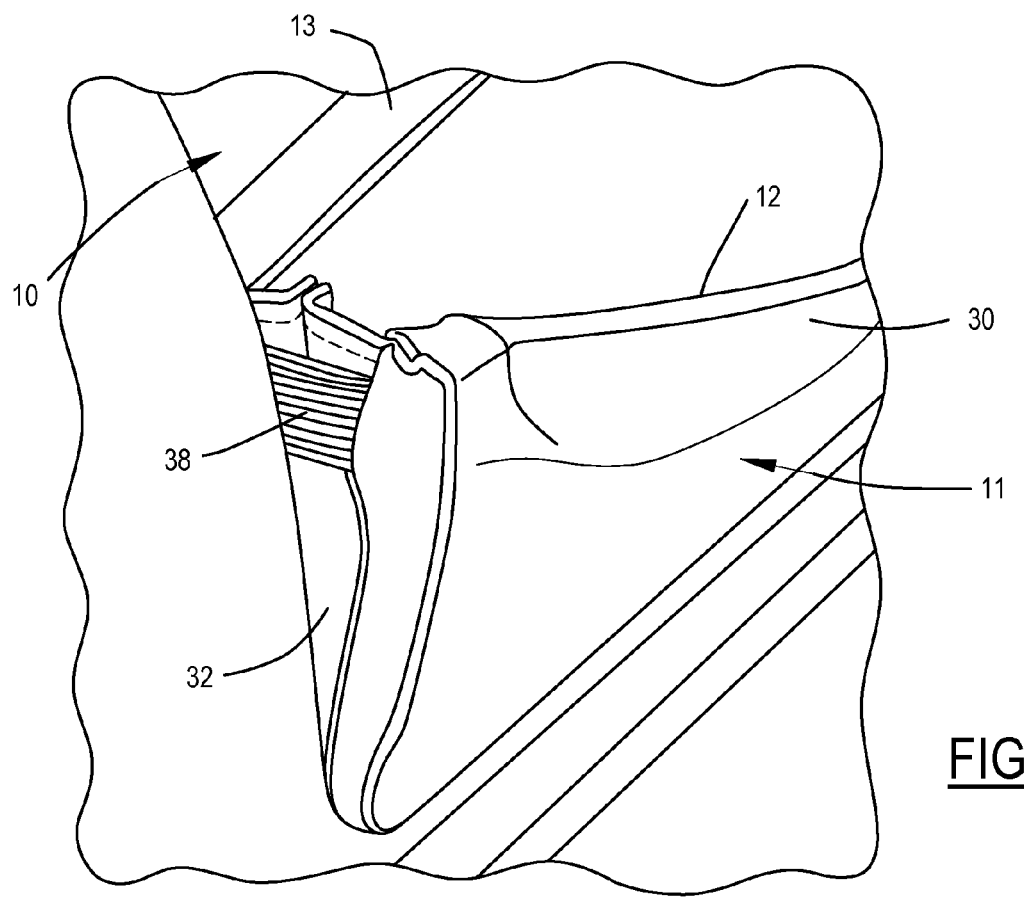
FIG. 4 is a partial perspective view of the map pocket being stretched into an expanded position.
Figure 5:
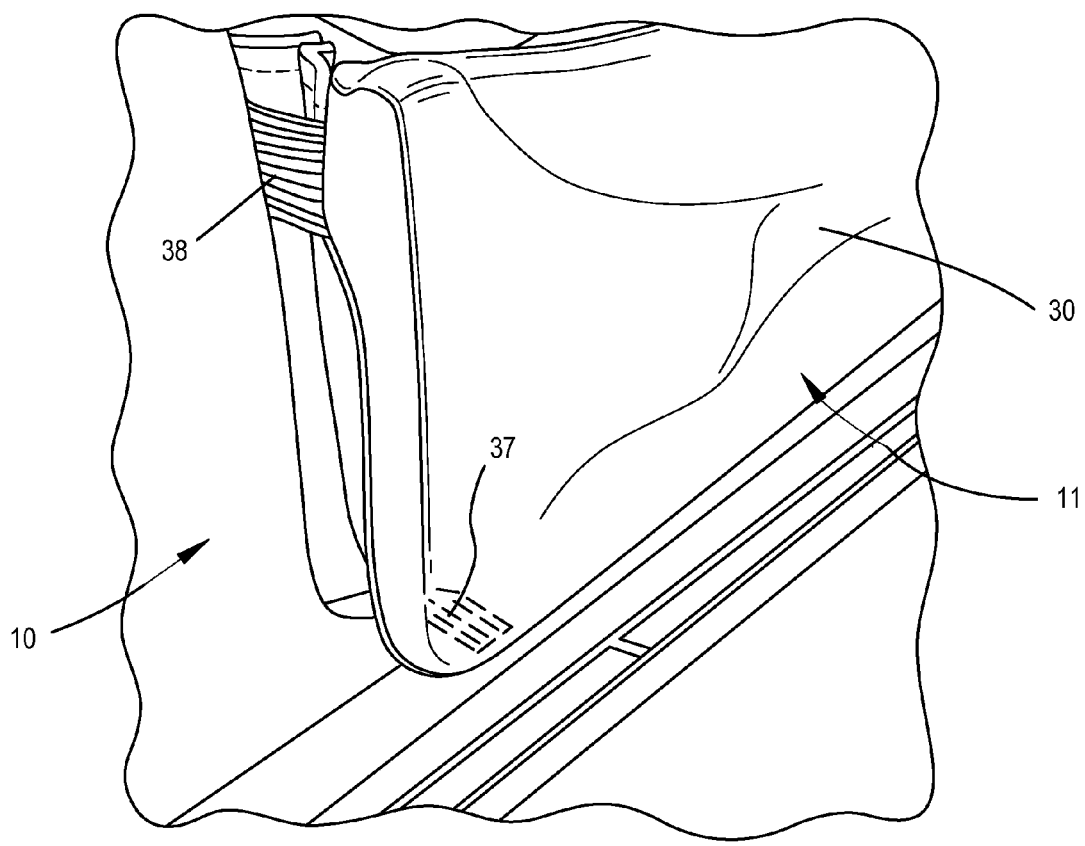
FIG. 5 is a partial perspective view of the map pocket being stretched into an even farther expanded position.

Each tether can expand independently to achieve different arrangements of contents being placed inside the pocket. As shown in FIG. 4, upper edge 12 is pulled to an open position and tether 38 is stretched so that cover 30 is expanded along its upper edge, thereby increasing the opening size for the map pocket. As shown in FIG. 5, expansion along the bottom edge of the map pocket is obtained by stretching tether 37 in a similar manner.

Figure 6:
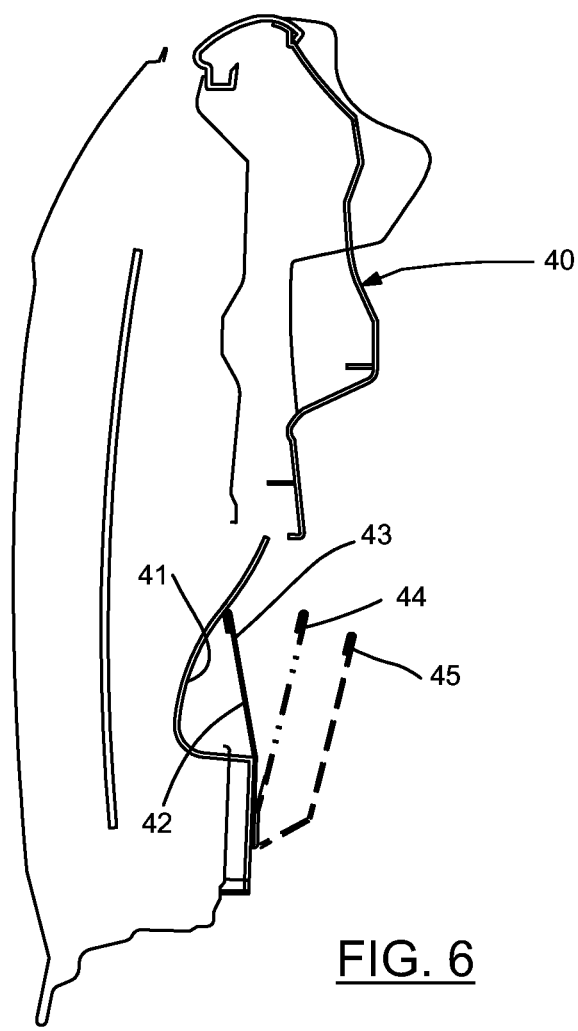
FIG. 6 is a side cross section of another embodiment of a map pocket according to the present invention.

FIG. 6 shows a side view of another embodiment in which a door panel 40 has a recess 41. A frame and pocket cover assembly 42 has a closed, unexpanded position shown at 43. By pulling on the spring piece of the frame without stretching the tethers, assembly 42 moves to the open position shown at 44. By expanding the tethers, frame and pocket cover 42 can be moved to the position shown at 45.

Figure 7:
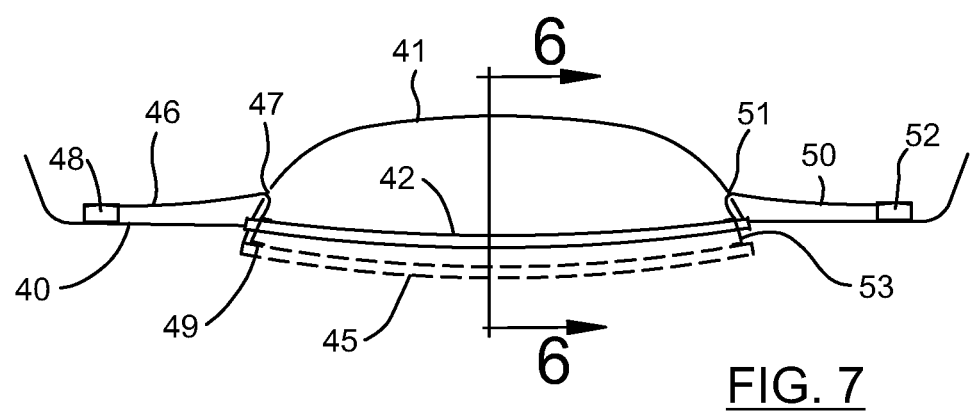
FIG. 7 is a top view showing expansion of a map pocket according to the present invention.

In the top view of FIG. 7, a tether 46 passes through an opening 47 in door panel 40 proximate an edge of recess 41 and attaches to an anchor point 48 and to frame and pocket cover 42. Similarly, a tether 50 passes through another opening 51 and attaches to an anchor point 52 and to the opposite side of frame and pocket cover 42 at 53. The majority of the length of each tether 46 and 50 is disposed between openings 47 and 51 and anchor points 48 and 52, respectively. The extra length allows expansion to the position shown at 45 while maintaining a closing force in both positions that urges frame and cover 42 toward door panel 42 at all times, while maintaining the force at an appropriate level to allow expansion away from door panel 40.

What is claimed is:

1. A storage compartment for a transportation vehicle, comprising:
    a door panel having a recess, wherein the door panel has a contoured shelf located above the recess, and wherein the contoured shelf has a concave edge for receiving the flexible spring piece in the closed position;
    a frame displaceable from the door panel and comprising a U-shaped member and a flexible spring piece, wherein the U-shaped member has a first terminus and a second terminus separated by a predetermined distance, wherein the flexible spring piece has first and second ends connected to the first terminus and the second terminus, respectively, and wherein the flexible spring piece has a length between the first and second ends greater than the predetermined distance so that the flexible spring piece tends to assume either a closed position proximate the recess or an open position away from the recess;
    a pocket cover having a front portion concealing the frame and having a folding side portion disposed between side and bottom edges of the frame and the door panel along corresponding edges of the recess; and
    a tether coupled to the frame for urging the frame toward the door panel while permitting top, bottom, and side edges of the frame to be moved away from the door panel.

2. The compartment of claim 1 wherein the flexible spring piece is comprised of a steel member.

3. The compartment of claim 1 wherein the flexible spring piece is comprised of plastic.

4. The compartment of claim 1 wherein the flexible spring piece is pivotably connected to the U-shaped member.

5. The compartment of claim 1 wherein the contoured shelf has a finger notch projecting into the concave edge to provide a gap to facilitate grasping of the flexible spring piece.

6. The compartment of claim 1 wherein the tether is comprised of stretchable elastic.

7. The compartment of claim 6 wherein the tether has a first end coupled to the frame and has a second end coupled to the door panel at an anchor point.

8. The compartment of claim 7 wherein the door panel includes an opening proximate to an edge of the recess, and wherein the tether passes through the opening so that a majority of the length of the tether is disposed between the opening and the anchor point.

9. The compartment of claim 6 wherein the tether is coupled to the frame by being directly attached to the pocket cover.

10. The compartment of claim 1 comprising at least three tethers, wherein at least one tether has a first end coupled to each side of the U-shaped member and to the bottom of the U-shaped member, respectively and a second end coupled to the door panel, and wherein each tether is comprised of stretchable elastic.

11. The compartment of claim 1 wherein the pocket cover is comprised of vinyl.

12. The compartment of claim 1 wherein the pocket cover is comprised of leather.

13. The compartment of claim 1 wherein the pocket cover is comprised of fabric.

* * * * *